US011119760B2

(12) United States Patent
De Capoa et al.

(10) Patent No.: US 11,119,760 B2
(45) Date of Patent: Sep. 14, 2021

(54) IDENTIFYING AND DELETING UNNECESSARY CODE LINES

(71) Applicant: International Business Machines Corporation, Armonk, NY (US)

(72) Inventors: Gabriele De Capoa, Rome (IT); Emilia Amato, Mignano Monte Lungo (IT); Crescenzo Migliaccio, Naples (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/656,053

(22) Filed: Oct. 17, 2019

(65) Prior Publication Data

US 2021/0117184 A1   Apr. 22, 2021

(51) Int. Cl.
*G06F 9/44* (2018.01)
*G06F 8/72* (2018.01)

(52) U.S. Cl.
CPC ...................... *G06F 8/72* (2013.01)

(58) Field of Classification Search
CPC ......................................................... G06F 8/72
USPC ......................................................... 717/123
See application file for complete search history.

(56) References Cited

U.S. PATENT DOCUMENTS

| | | | |
|---|---|---|---|
| 9,727,736 B1 * | 8/2017 | McClintock | ............... G06F 8/77 |
| 2002/0104087 A1 * | 8/2002 | Schaffer | ................. H04N 7/163 |
| | | | 725/46 |
| 2004/0181677 A1 * | 9/2004 | Hong | .................... H04L 63/145 |
| | | | 713/188 |
| 2011/0131166 A1 * | 6/2011 | Li | .......................... G06N 20/00 |
| | | | 706/25 |
| 2017/0123790 A1 | 5/2017 | Gupta et al. | |
| 2017/0161177 A1 * | 6/2017 | Bird | ......................... G06F 8/72 |
| 2018/0285103 A1 | 10/2018 | Jha | |

OTHER PUBLICATIONS

Mell et al., "Effectively and Securely Using the Cloud Computing Paradigm" dated Oct. 7, 2009, NIST, Information Technology Laboratory, Total 80 pages.
Mell et al., "The NIST Definition of Cloud Computing" dated Sep. 2011, Recommendations of the National Institute of Standards and Technology, Total 7 pages.

* cited by examiner

*Primary Examiner* — Evral E Bodden
(74) *Attorney, Agent, or Firm* — Konrad Raynes Davda & Victor LLP; Janaki K. Davda

(57) ABSTRACT

Provided are techniques for identifying and deleting unnecessary code lines. A plurality of global behavioral rules are stored, where each of the global behavioral rules includes a behavioral pattern code fragment, a plurality of recommendations, and a recommendation score for each of the plurality of recommendations. It is determined that a code fragment in a portion of code matches a behavioral pattern code fragment of a global behavioral rule of the plurality of global behavioral rules. A recommendation from the plurality of recommendations of the global behavioral rule is provided based on the recommendation score of that recommendation. In response to the recommendation being applied, a recommendation score of the recommendation is increased. In response to the recommendation being rejected, an action taken is identified, and the action taken is stored as a new recommendation for the behavioral pattern code fragment of the global behavioral rule.

18 Claims, 12 Drawing Sheets

Global Behavioral Rules 142                    144b

*Behavioral pattern code fragment
*Global occurrence value of the behavioral pattern code fragment
*One or more Recommendations
*Recommendation Score for each of the one or more Recommendations

•
•
•

144p

*Behavioral pattern code fragment
*Global occurrence value of the behavioral pattern code fragment
*One or more Recommendations
*Recommendation Score for each of the one or more Recommendations

FIG. 1B

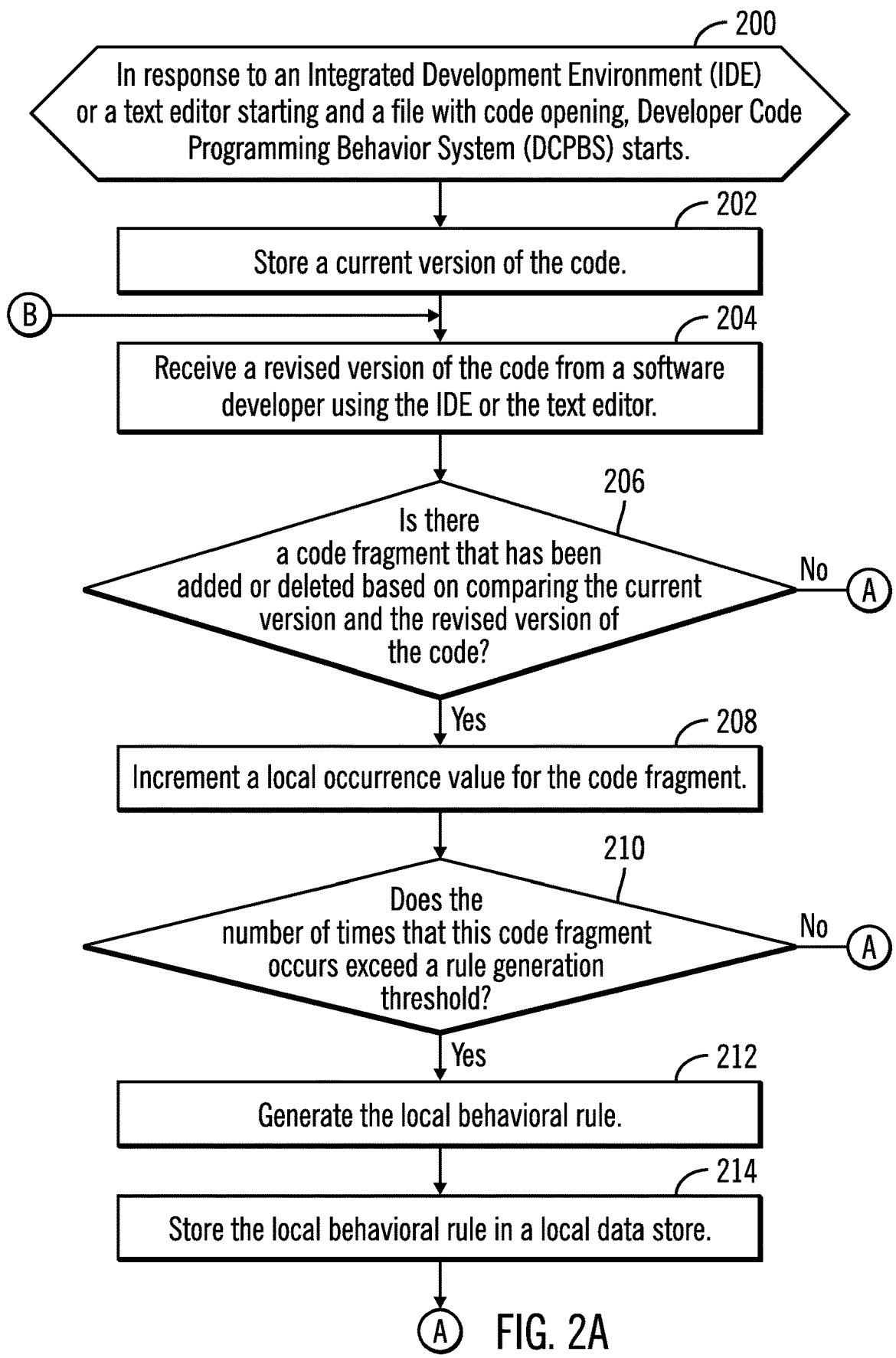

IDENTIFYING AND DELETING UNNECESSARY CODE LINES

BACKGROUND

Embodiments of the invention relate to identifying and deleting unnecessary code lines (e.g., from production code).

Every software developer, during development or debug phase, adds code lines that helps to understand what happens after a specific action (e.g., a Representational State Transfer (REST) Application Programming Interface (API) call, an unknown function, etc.). Once the development or debug phase is done, those added code lines should be deleted to generate production code for many reasons (e.g., they may contain sensitive data that should not be logged, they print an unnecessary message, etc.).

During code reviews by a reviewer, those added code lines should be highlighted by the reviewer, who asks the software developer to delete the added code lines. However, the reviewer may inadvertently skip or miss those added code lines during the review, which leaves the added code lines in the production code.

SUMMARY

In accordance with certain embodiments, a computer-implemented method is provided for identifying and deleting unnecessary code lines. The computer-implemented method comprises operations. A plurality of global behavioral rules are stored, where each of the global behavioral rules includes a behavioral pattern code fragment, a plurality of recommendations, and a recommendation score for each of the plurality of recommendations. It is determined that a code fragment in a portion of code matches a behavioral pattern code fragment of a global behavioral rule of the plurality of global behavioral rules. A recommendation from the plurality of recommendations of the global behavioral rule is provided based on the recommendation score of that recommendation. In response to the recommendation being applied, a recommendation score of the recommendation is increased. In response to the recommendation being rejected, an action taken is identified, and the action taken is stored as a new recommendation for the behavioral pattern code fragment of the global behavioral rule.

In accordance with other embodiments, a computer program product is provided for identifying and deleting unnecessary code lines. The computer program product comprises a computer readable storage medium having program code embodied therewith, the program code executable by at least one processor to perform operations. A plurality of global behavioral rules are stored, where each of the global behavioral rules includes a behavioral pattern code fragment, a plurality of recommendations, and a recommendation score for each of the plurality of recommendations. It is determined that a code fragment in a portion of code matches a behavioral pattern code fragment of a global behavioral rule of the plurality of global behavioral rules. A recommendation from the plurality of recommendations of the global behavioral rule is provided based on the recommendation score of that recommendation. In response to the recommendation being applied, a recommendation score of the recommendation is increased. In response to the recommendation being rejected, an action taken is identified, and the action taken is stored as a new recommendation for the behavioral pattern code fragment of the global behavioral rule.

In accordance with yet other embodiments, a computer system is provided for identifying and deleting unnecessary code lines. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. A plurality of global behavioral rules are stored, where each of the global behavioral rules includes a behavioral pattern code fragment, a plurality of recommendations, and a recommendation score for each of the plurality of recommendations. It is determined that a code fragment in a portion of code matches a behavioral pattern code fragment of a global behavioral rule of the plurality of global behavioral rules. A recommendation from the plurality of recommendations of the global behavioral rule is provided based on the recommendation score of that recommendation. In response to the recommendation being applied, a recommendation score of the recommendation is increased. In response to the recommendation being rejected, an action taken is identified, and the action taken is stored as a new recommendation for the behavioral pattern code fragment of the global behavioral rule.

BRIEF DESCRIPTION OF THE SEVERAL VIEWS OF THE DRAWINGS

Referring now to the drawings in which like reference numbers represent corresponding parts throughout:

FIGS. 1A, 1B, and 1C illustrate, in a block diagram, a computing environment in accordance with certain embodiments.

FIGS. 2A and 2B illustrate, in a flowchart, operations for generating local behavioral rules in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments dynamically analyze the behavior of a software developer while the software developer is working on code lines of code. In particular, embodiments learn the behavioral patterns of the software developer during the development and debug phases for the code and store behavior rules to reflect those behavioral patterns. A source code management server stores behavior rules representing behavioral patterns of multiple software developers. Embodiments analyze the code stored at the source code management server to verify whether any of those behavior rules occur in the code and provide recommendations for any found behavior rules. Embodiments also provide a recommendation of the best action to perform with code lines that match with those behavioral patterns of behavioral rules based on the actions performed by the multiple software developers.

Figure 1A:
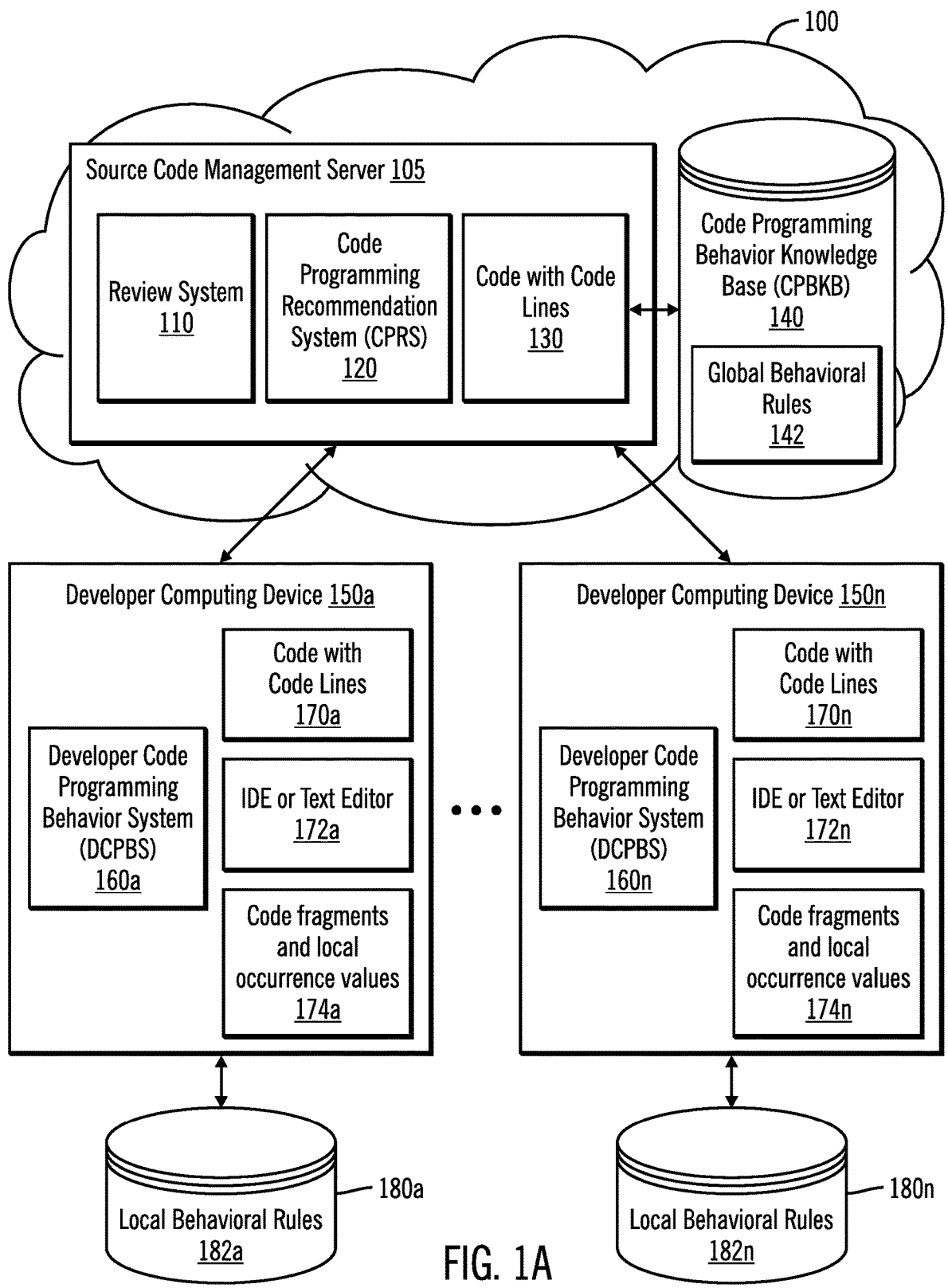
Figure 1C:
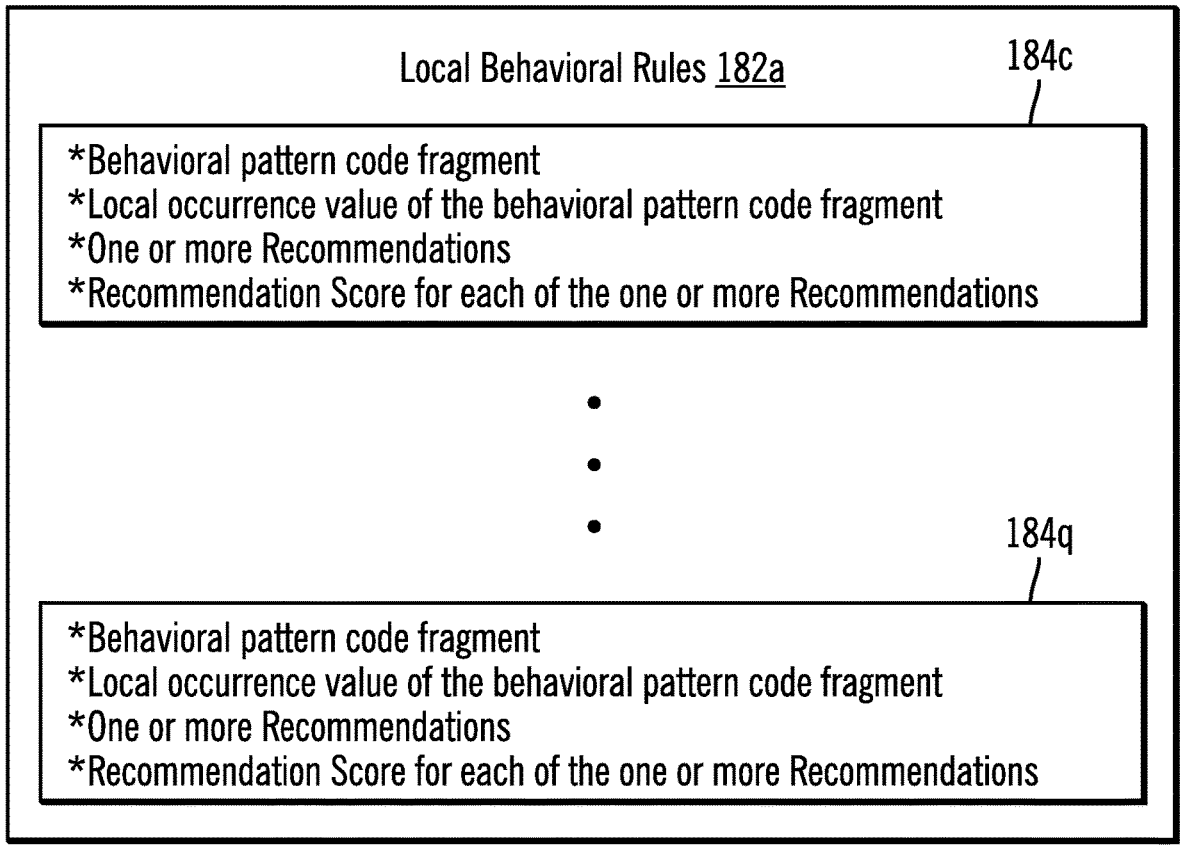

FIGS. 1A, 1B, and 1C illustrate, in a block diagram, a computing environment in accordance with certain embodiments. A cloud infrastructure 100 includes a source code management server 105 and a Code Programming Behavior Knowledge Base (CPBKB, "knowledge base" or "common knowledge base") 140. The source code management server 105 is connected to the CPBKB 140. The source code management server 105 includes a review system 110, a Code Programming Recommendation System (CPRS or "recommendation system") 120, and code with code lines 130. In certain embodiments, the review system 110 is a review bot, which is a program for performing a code review that is run automatically on the source code management server 105 each time new code lines 130 are uploaded to the source code management server 105. The code with code lines 130 includes code from multiple software developers.

The Code Programming Behavior Knowledge Base (CPBKB, "knowledge base" or "common knowledge base") 140 may be described as a cloud data store and stores global behavioral rules 142 ("behavioral rules on the cloud"). As illustrated in FIG. 1B, each of the global behavioral rules 142 includes a behavioral pattern code fragment, global occurrences of the behavioral pattern code fragment, one or more recommendations, and a recommendation score for each of the one or more recommendations 144b . . . 144p. The global behavioral rules 142 at the CPBKB 140 represent the behavioral patterns of multiple software developers (e.g., worldwide or in any pre-defined group).

The source code management server 105 is coupled to developer computing devices 150a . . . 150n. Each developer computing device 150a . . . 150n includes a Developer Code Programming Behavior System (DCPBS) 160a . . . 160n, code with code lines 170a . . . 170n, an Integrated Development Environment (IDE) or a text editor 172a . . . 172n, and code fragments and local occurrence values 174a . . . 174n for each of the code fragments. An IDE may be described as a set of tools (e.g., text editor, compiler, debugger, etc.) that work together, while a text editor may be described as a tool for editing text. In certain embodiments, the IDE and the text editor each display code in a Graphical User Interface (GUI). With embodiments, when a code fragment has occurred a number of times exceeding a rule generation threshold, the DCPBS 160a . . . 160n determines that the code fragment is to be part of a local behavioral rule 182a . . . 182n.

Each developer computing device 150a . . . 150n is coupled to a local data store 180a . . . 180n storing local behavioral rules 182a . . . 182n. The DCPBS 160a . . . 160n analyzes developer behavioral patterns, generates the local behavioral rules 182a . . . 182n, sends the local behavioral rules 182a . . . 182n to the CPRS 120 for storing in the CPBKB 140 as global behavioral rules 142, and sends the code 170a . . . 170n to the source code management server 105 for storage as code 130. In certain embodiments, the code 130, 170a . . . 170n is source code.

As illustrated in FIG. 1C, each of the local behavioral rules 182a includes a behavioral pattern code fragment, local occurrences of the behavioral pattern code fragment, one or more recommendations, and a recommendation score for each of the one or more recommendation 184c . . . 184q. The local behavioral rules 182a represent the behavioral pattern of any software developer editing code using the developer computing device 150a. The other local behavioral rules (e.g., local behavioral rules 182n) also have the elements of the local behavioral rules 182a. Also, one global behavioral rule 142 may be a consolidation of multiple local behavioral rules 182a . . . 182n to represent multiple software developers working from different developer computing devices 150a . . . 150n.

The review system 110 analyzes the code 130 to look for unnecessary code lines. Unnecessary code lines may be described as code lines that may be removed from the code before executing the code, and these unnecessary code lines are "unneeded" or not needed to execute the code 130. With embodiments, the code 130 may be described as committed when the code is uploaded to the source code management server 105 for storage (i.e., the code with code lines 170a . . . 170n becomes the code with code lines 130. Unnecessary code lines may be described as code lines that match a behavior pattern code fragment of a global behavior rule and should be deleted (i.e., removed) from the code 130 before the code 130 is used in a production phase. The CPRS 120 proposes solutions to be taken after the analysis of the review system 110.

The DCPBS 160a . . . 160n identifies a local behavioral rule 182a . . . 182n, based on the software developer's style and way of writing code. For example, if the software developer has a pattern of using particular terms or characters (e.g., asterisks (**), exclamation marks (!!), "bar", "foo", etc.) before code lines that are later deleted, the DCPBS 160a . . . 160n may generate a local behavioral rule 182a . . . 182n to indicate that a code line with such a term or characters may be unnecessary. As another example, if the software developer writes a code line and later deletes that code line, the DCPBS 160a . . . 160n may generate another local behavioral rule 182a . . . 182n indicating that the particular code line may be unnecessary.

Figure 2B:
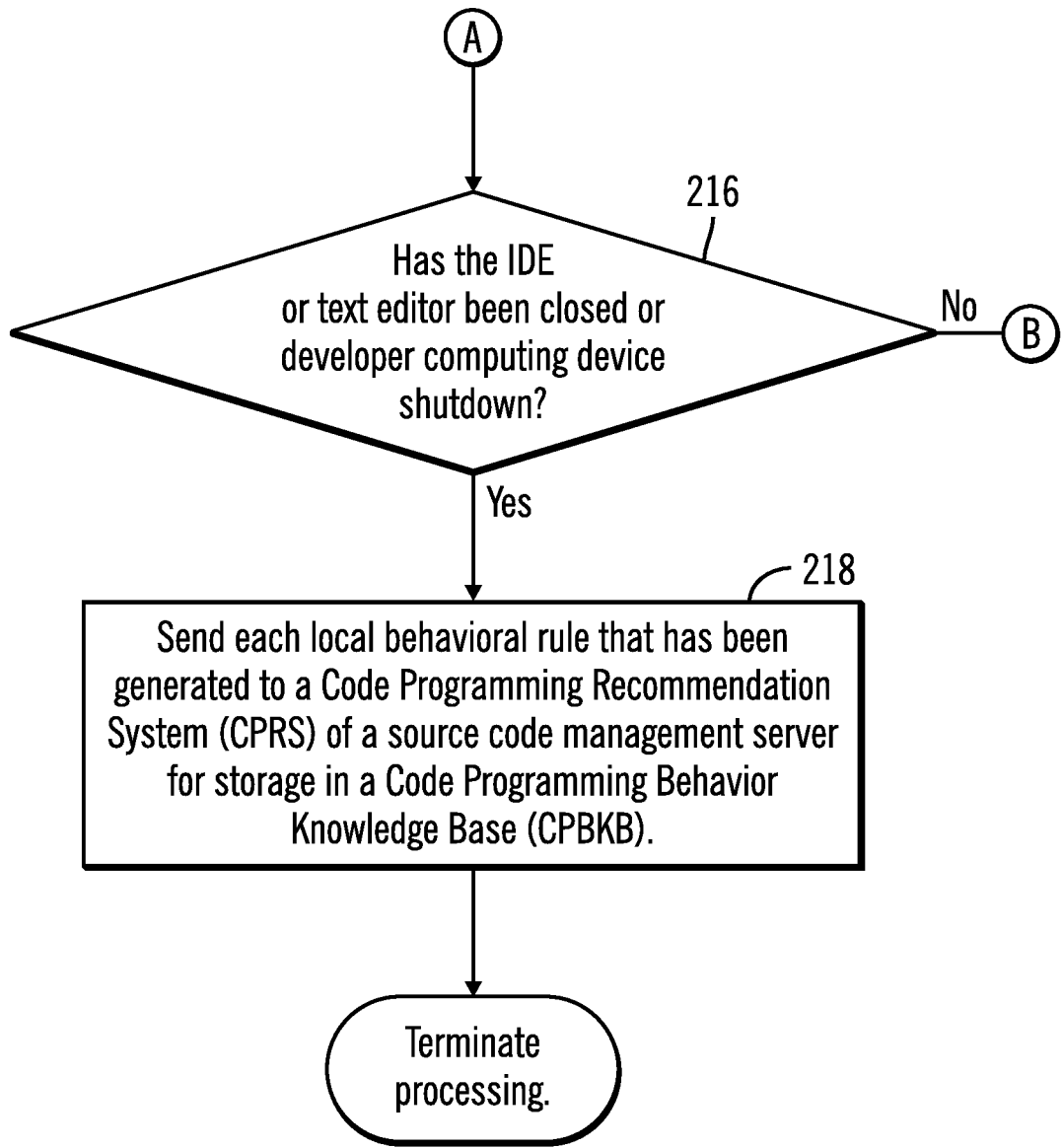

FIGS. 2A and 2B illustrate, in a flowchart, operations for generating local behavioral rules in accordance with certain embodiments. In response to an IDE or a text editor 172a . . . 172n starting and a file with code opening, control begins at block 200 with a DCPBS 160a . . . 160n of a developer computing device 150a . . . 150n, starting. With certain embodiments, the beginning of the IDE or text editor 172a . . . 172n triggers the DCPBS 160a . . . 160n to start. With certain embodiments, the software developer opens the IDE or text editor 172a . . . 172n to edit code.

In block 202, the DCPBS 160a . . . 160n stores a current version of the code (e.g., in temporary memory). In block 204, the DCPBS 160a . . . 160n receives a revised (edited) version of the code from a software developer using the IDE or the text editor 172a . . . 172n. The revised version of the code may include any combination of added and deleted code lines or may include minor or no changes. For example, if the same code fragment was deleted multiple times, this may trigger a local behavioral rule that includes a recommendation to delete that code fragment.

In block 206, the DCPBS 160a . . . 160n determines whether there is a code fragment that has been added or deleted based on comparing the current version and the revised version of the code. If so, processing continues to block 208, otherwise, processing continues to block 216.

In block 208, the DCPBS 160a . . . 160n increments a local occurrence value for the code fragment. If this is the first time that the code fragment has been found, then the code fragment is stored with a local occurrence value of one ("1").

In block 210, the DCPBS 160a . . . 160n determines whether the number of times that this code fragment occurs exceeds a rule generation threshold. If so, processing continues to block 212, otherwise, processing continues to block 216.

In certain embodiments, the behavioral rule is generated when the number of occurrences of a code fragment representing a behavioral pattern of the software developer exceeds the rule generation threshold. The rule generation threshold may be pre-configured or modified. Also, there may be different rule generation thresholds for different programming languages, different software developers, etc.

In block 212, the DCPBS 160a . . . 160n generates the behavioral rule. In block 214, the DCPBS 160a . . . 160n stores the local behavioral rule in the local data store 180a . . . 180n. From block 214 (FIG. 2A), processing continues to block 216 (FIG. 2B).

In block 216, if the IDE or text editor 172a . . . 172n has closed or the developer computing device 150a . . . 150n has shut down, processing continues to block 218 (FIG. 2B), otherwise, processing continues to block 204.

In block 218, the DCPBS 160a . . . 160n sends each local behavioral rule 182a . . . 182n that has been generated to the CPRS 120 of a source code management server 105 for storage in the CPBKB 140. Each local behavioral rule 182a . . . 182n is stored as a global behavioral rule 142 in the CPBKB 140. Then, the DCPBS 160a . . . 160n terminates processing.

Thus, with certain embodiments, as soon as the IDE or text editor 172a . . . 172n starts, the corresponding DCPBS 16a . . . 160n also starts and records the actions performed by the software developer during a code writing phase. Those actions are analyzed to define local behavioral rules 182a . . . 182n for that software developer. The local behavioral rules generated are stored in the CPBKB 140 based on any of the following triggers: the IDE or text editor 172a . . . 172n closed or the developer computing device 150a . . . 150n shutdown. In certain embodiments, the local behavioral rule may be stored in the CPBKB 140 upon generation.

Figure 3:
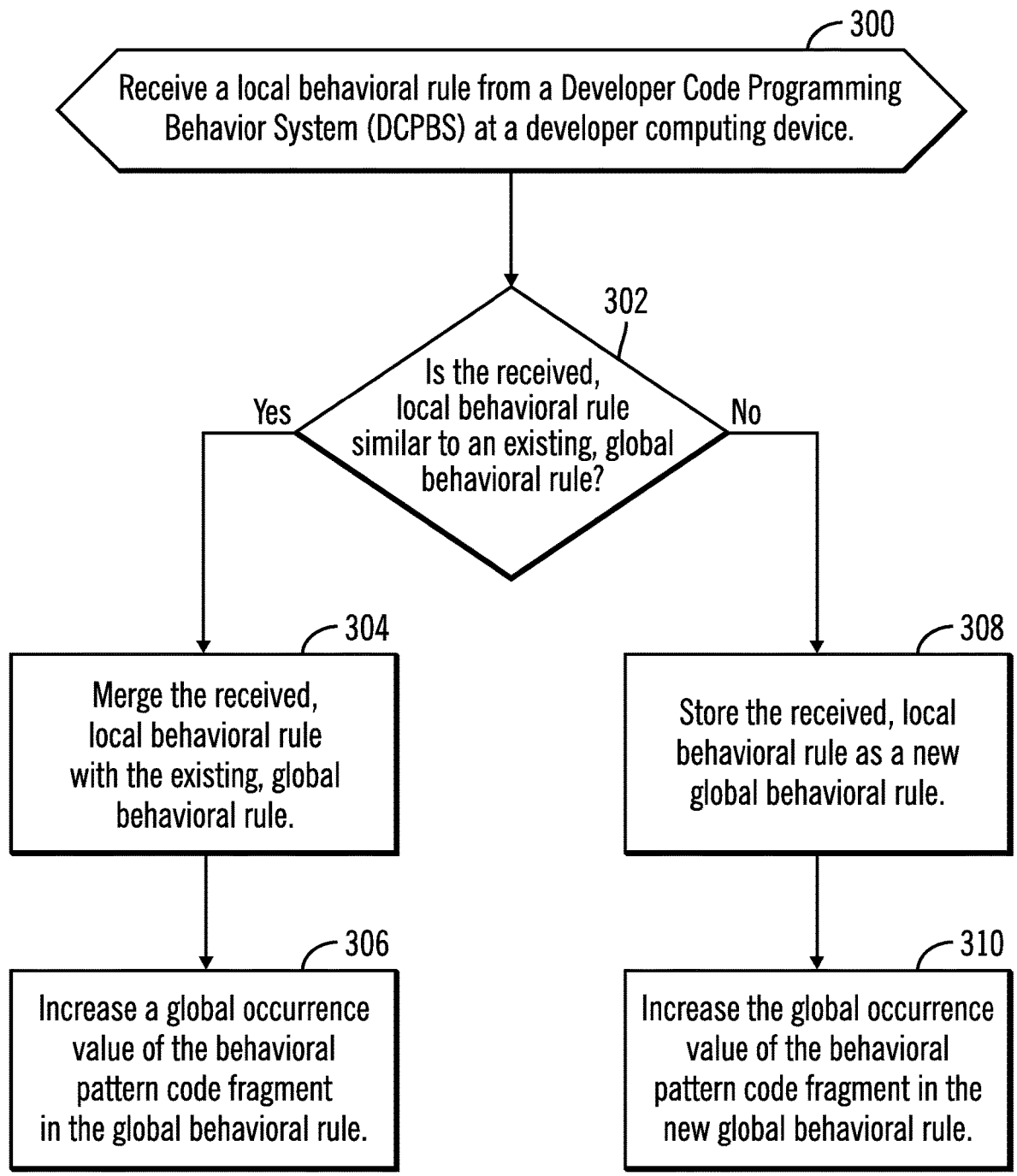
FIG. 3 illustrates, in a flowchart, operations for processing a global behavioral rule in accordance with certain embodiments.

FIG. 3 illustrates, in a flowchart, operations for processing a global behavioral rule 142 in accordance with certain embodiments. Control begins at block 300 with the CPRS 120 receiving a local behavioral rule 182a . . . 182n from the DCPBS 160a . . . 160n at a developer computing device 150a . . . 150n. In block 302, the CPRS 120 determines whether the received, local behavioral rule 182a . . . 182n is similar to an existing, global behavioral rule 142. If so, processing continues to block 304, otherwise, processing continues to block 308.

In block 304, the CPRS 120 merges (collapses) the received, local behavioral rule 182a . . . 182n with the existing, global behavioral rule 142. In certain embodiments, similarity is found based on an exact match. In other embodiments, similarity is found using fuzzy logic (e.g., a match based on similarity exceeding a similarity threshold). In certain embodiments, if there are multiple, similar global behavioral rules that match, the CPRS 120 selects the one with the highest global occurrence value. In block 306, the CPRS 120 increases the global occurrence value of the behavioral pattern code fragment in the global behavioral rule 142.

In block 308, the CPRS 120 stores the received, local behavioral 182a . . . 182b as a new global behavioral rule 142. In block 108, the CPRS 120 increases the global occurrence value of the behavioral pattern code fragment in the new global behavioral rule 142.

In certain embodiments, the processing of FIG. 3 occurs for each local behavioral rule 182a . . . 182n received by the CPRS 120 for storage in the CPBKB 142. With certain embodiments, the local behavioral rules 182a . . . 182n may be received in a batch. Because the global occurrence value reflects the occurrences of the behavioral rule across multiple developers, the global occurrence value may be higher than the local occurrence value of a particular local behavioral rule.

Figure 4A:
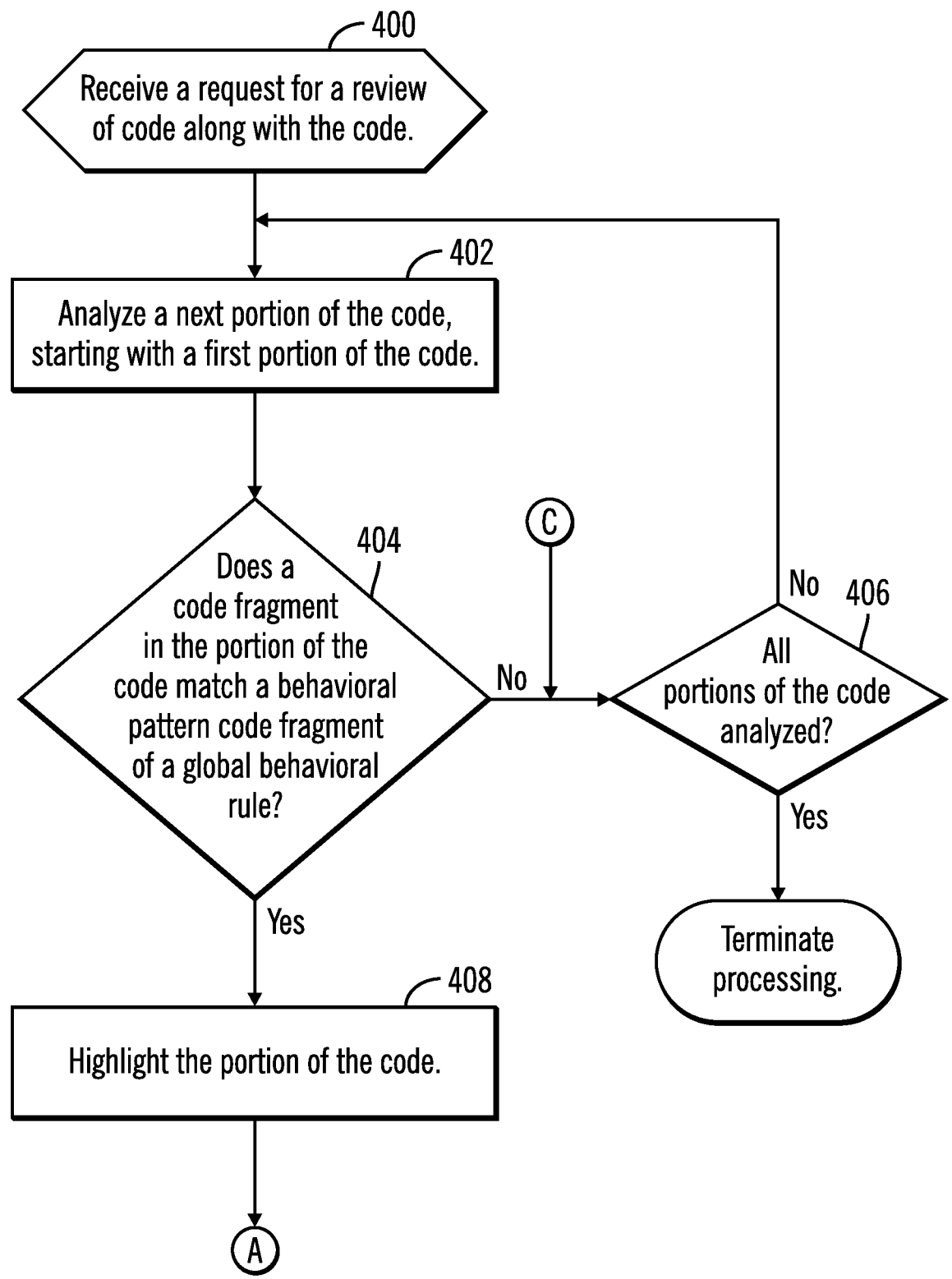
FIGS. 4A, 4B, and 4C illustrate, in a flowchart, operations for generating a recommendation in accordance with certain embodiments.
Figure 4B:
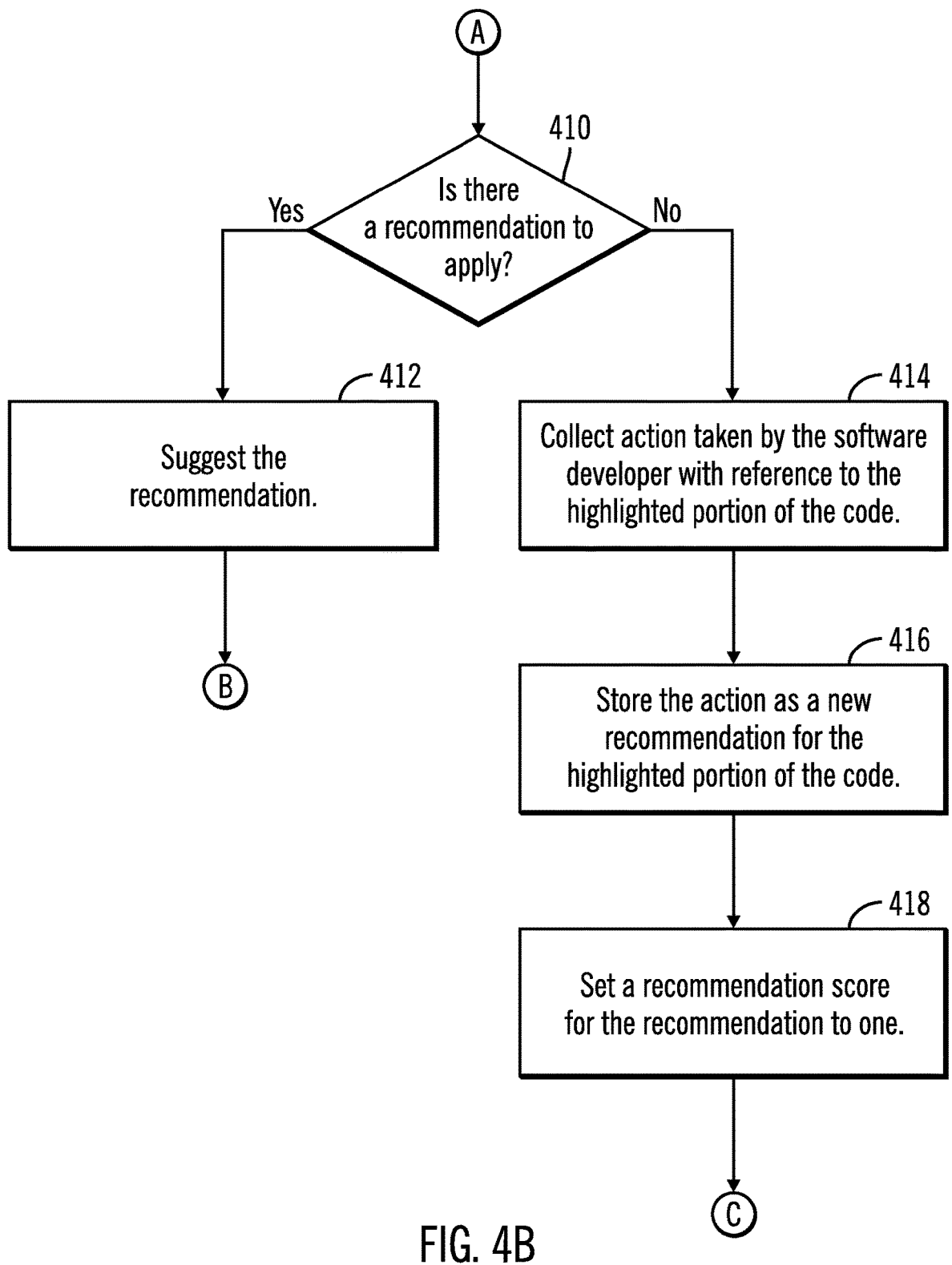
Figure 4C:
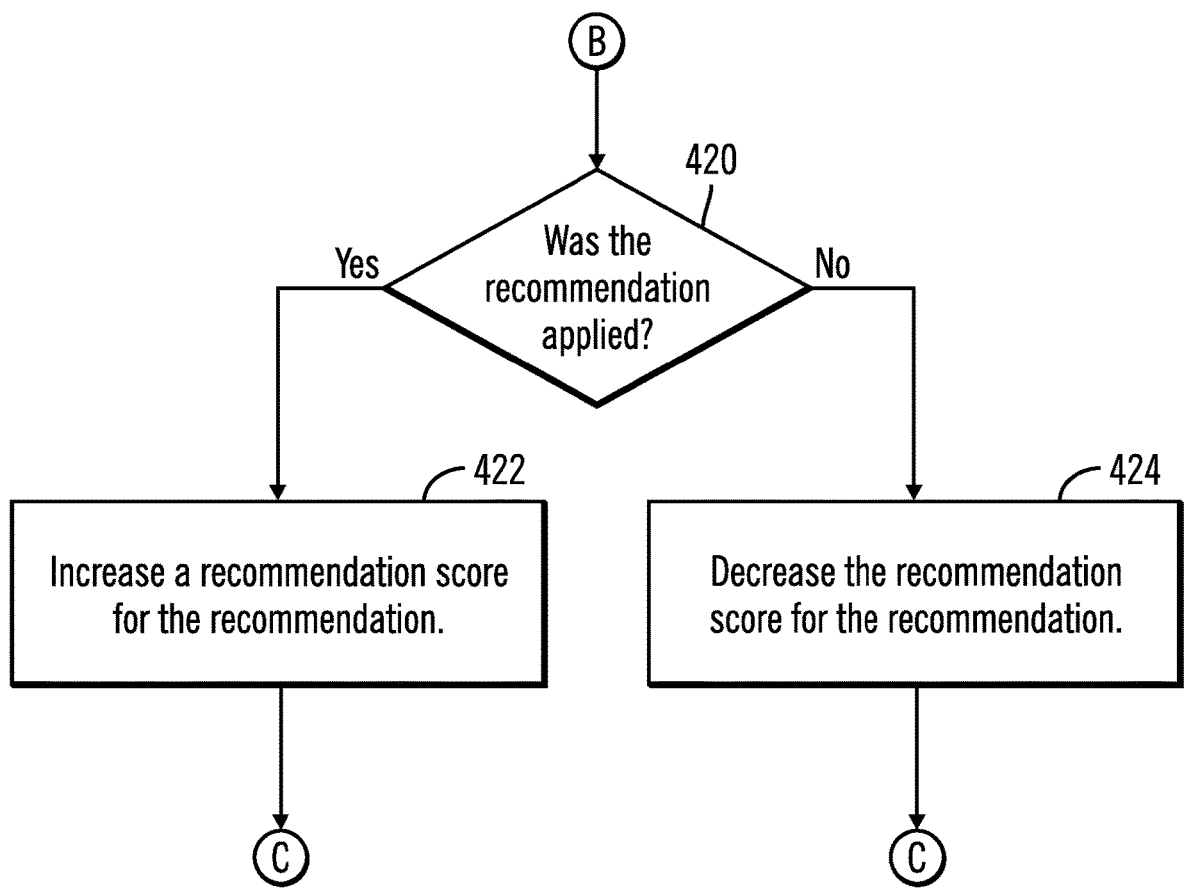

FIGS. 4A, 4B, and 4C illustrate, in a flowchart, operations for generating a recommendation in accordance with certain embodiments. In certain embodiments, the recommendation is the best recommendation to apply. Control begins at block 400 with the review system 110 receiving a request for review of code 130 along with the code. In block 402, the review system 110 analyzes a next portion of the code, starting with a first portion of the code. A portion of the code may include one or more code lines. The analysis includes both code line by code line analysis and analysis of different groups of code lines. In block 404, the review system 110 determines whether a code fragment in the portion of the code matches a behavioral pattern code fragment of a global behavioral rule 142. The code fragment in the portion of the code may be one code line or a group of code lines. The global behavioral rule 142 may represent a local behavioral rule 182a . . . 182n for the same software developer who developed the code being reviewed or for another software developer who developed other code. If so, processing continues to block 408, otherwise, processing continues to block 406.

In block 406, the review system 110 determines whether all portions of the code have been analyzed. If so, processing ends, otherwise, processing continues to block 402.

In block 408, the review system 110 highlights the portion of the code on a text editor or on a web page. Highlighting may include any combination of: changing a color of the portion of the code, drawing a shape (e.g., a box or oval) around the portion of the code, covering the portion of the code in a color (e.g., a yellow color), etc. The review system 110 passes control to the CPRS 120. Also, from block 408 (FIG. 4A), processing continues to block 410 (FIG. 4B). In block 410, the CPRS 120 determines whether there is a recommendation to apply. If so, processing continues to block 412, otherwise, processing continues to block 414.

In block 414, the CPRS 120 collects the action taken by the software developer (e.g., a reviewer) with reference to the highlighted code. In block 416, the CPRS 120 stores the action as a new recommendation for the highlighted code. In block 418, the CPRS 120 sets a recommendation score for the recommendation to one ("1"). From block 418 (FIG. 4B), processing continues to block 406 (FIG. 4A).

In block 412, the CPRS 120 suggests the recommendation. In certain embodiments, the recommendation is one with a highest recommendation score out of a plurality of recommendations. For example, if one recommendation is to delete code lines and another recommendation is to add a comment, then the recommendation with the highest recommendation score (i.e., the recommendation most often chosen), is suggested. From block 412 (FIG. 4B), processing continues to block 420 (FIG. 4C). In block 420, the CPRS 120 determines whether the recommendation was applied. If applied, processing continues to block 422, otherwise, if rejected (not applied), processing continues to block 424. In block 422, the CPRS 120 increases a recommendation score for the recommendation. In block 424, the CPRS 120 decreases the recommendation score for the recommendation. From blocks 420 and 422 (FIG. 4C), processing continues to block 406 (FIG. 4A).

Thus, with certain embodiments, the review system 110 analyzes each code line committed into the source code management server 105 and highlights to the software developer which code lines are not necessary and should not be in a production release of the code. The CPRS 12 also recommends to the software developer the best action to take for those highlighted lines.

Merely to enhance embodiments, a practical example is provided. In this example, the software developer adds to code, during a troubleshooting phase, phrases such as "I am Here", "*****", etc. The DCPBS 160a . . . 160n is in monitoring mode (to monitor the code changes) on the IDE that the programmer is using to write code. The DCPBS 160a . . . 160n performs the monitoring in order to analyze and record the behavior of the software developer.

If the software developer subsequently deletes the added phrases used in the troubleshooting phase, then the DCPBS 160a . . . 160n defines a local behavioral rule 182a . . . 182n. When, the local behavioral rule 182a . . . 182n is sent to the source code management server 105, the local behavioral rule 182a . . . 182n is stored in the cloud infrastructure 100 as a global behavioral rule 142 in the CPBKB 140.

Then, the review system 105 uses the global behavioral rules 142 in the data store 140. The review system 105 scans the code before the code is published in a production phase.

As soon as a new local behavioral rule 182a . . . 182n arrives at the CPBKB 140, the review system 105 analyzes the local behavioral rule 182a . . . 182n to identify any similar global behavioral rule 142. The CPRS 120 stores the number of occurrences 146 of the global behavioral rule 142.

If the review system 110 identifies one or more global behavioral rules 142 for a code line in the committed code, the review system 110 highlights the code line for the software developer in a graphical interface (e.g., at the developer computing device 15a . . . 150n).

In certain embodiments, the CPRS 120 identifies a recommendation for the highlighted code line, and the review system 110 provides the recommendation (e.g., the best recommendation to apply) based on previous feedback from other software developers. In certain embodiments, the recommendation is one that was chosen by a high number of software developers and has not generated any issues during the publishing of the code in the production phase.

In certain embodiments, the recommendation may be to comment the code line or to delete the code line.

When the review is completed, and the code is merged into the production phase, the CPRS 120 collects the action taken by the software developer and updates the recommendations of related global behavioral rules 142, while increasing or decreasing the recommendation score for that recommendation.

In certain embodiments, as soon as the IDE or the text editor starts and a file is opened, the DCPBS 160a . . . 160n copies the file content of the file into a buffer section (e.g., a temporary memory location, accessible by the DCPBS 160a . . . 160n).

After some code is written, if one of the trigger actions occurs, then the DCPBS 160a . . . 160n calculates the difference between the current version of the file and the previous version of the file in the buffer section to identify any code lines that have been deleted or that have been added.

With certain embodiments, those code lines that have been deleted or added are highlighted and stored as a linked list (to keep ordering) into a sparse data structure (e.g., a bitmap), where an index into the bitmap represents the number of occurrences of a behavioral rule. This data structure represents the set of potential behavioral rules.

In certain embodiments, the trigger that initiates creation of the potential behavioral rules are: run of the code written, saving intentionally the code written, and saving the code and closing the IDE or the text editor.

Each time a new linked list of potential behavioral rules is created, that linked list may be compared to the behavioral rules contained in the bitmap.

Given a new linked list A and an old linked list B, embodiments define a measurement called LM (lines matched) and defined as the ratio between code lines exactly equal between A and B and the number of code lines contained in B.

For each old linked list B in the data structure:
if LM=1, then A=B, the new linked list A is not stored and the number of occurrence of the old linked list B (moving B into the bitmap index) is increased, and the loop is exited;
if LM=0, then A≠B, then, if another old linked list B exists, the next, old linked list B is selected for comparison to the new linked list A, otherwise, if no other old linked list B is available to compare to the new linked list A, then A is saved in the data structure and the loop is exited;
if 0<LM<1, then embodiments evaluate a similarity threshold (ST, which is configurable, and with a default of 0.6).
  if LM≥ST, then A≈B, then the new linked list A is not stored and the number of occurrence of the old linked list B (moving B into the bitmap index) is increased, and the loop is exited;
  if LM<ST, then, if another old linked list B exists, the next, old linked list B is selected for comparison to the new linked list A, otherwise, if no other old linked list B is available to compare to the new linked list A, then A is saved in the data structure and the loop is exited.

Once a linked list is movd to a specific index that represent a configurable threshold, then those potential behavioral rules became local behavioral rules and are sent to the CPBKB 142 for storage as global behavioral rules.

Embodiments provide a code review mechanism that is agnostic from the single reviewer and developer and that leverages the developing behavior of worldwide software developers. Embodiments are agnostic from the concept of error, but analyze each code line added and/or deleted to define a behavioral rule. Embodiments provide assistance during code review to identify code lines that should be deleted in a production release of the code for any reason (e.g. debug code).

Certain embodiments provide a technique for source code analysis that performs: observing source code editing actions performed by a human user of a source code editor program on a first source code file; based on the observed editing actions, deriving at least one behavioral rule related to the human user, the behavioral rule comprising at least one text pattern, which text pattern matches a behavioral pattern code fragment inserted by the human user into the code temporarily; and, based on the at least one behavioral rule, detecting in a second source code file the behavioral pattern code fragment.

In certain embodiments, deriving the at least one behavioral rule is based on detecting source code editing actions corresponding to insertion and subsequent deletion of a code fragment. In certain embodiments, observing the source code editing action is performed by a local DCPBS 160*a* . . . 160*n* installed on a developer computing device 150*a* . . . 150*n* (such as a personal electronic device). In certain embodiments, the behavioral rule is forwarded, by the local DCPBS 160*a* . . . 160*n*, to source code management server (e.g., an information system). In certain embodiments, during review of the same or different source code, at least one behavioral rule is retrieved and used to match the behavioral pattern code fragment of the at least one behavioral rule to a behavioral pattern code fragment in the source code being reviewed. Then, a recommendation is provided.

Thus, embodiments identify a behavioral pattern code fragment inserted by the developer into the code temporarily based on the editing behavior of the software developer.

Figure 5:
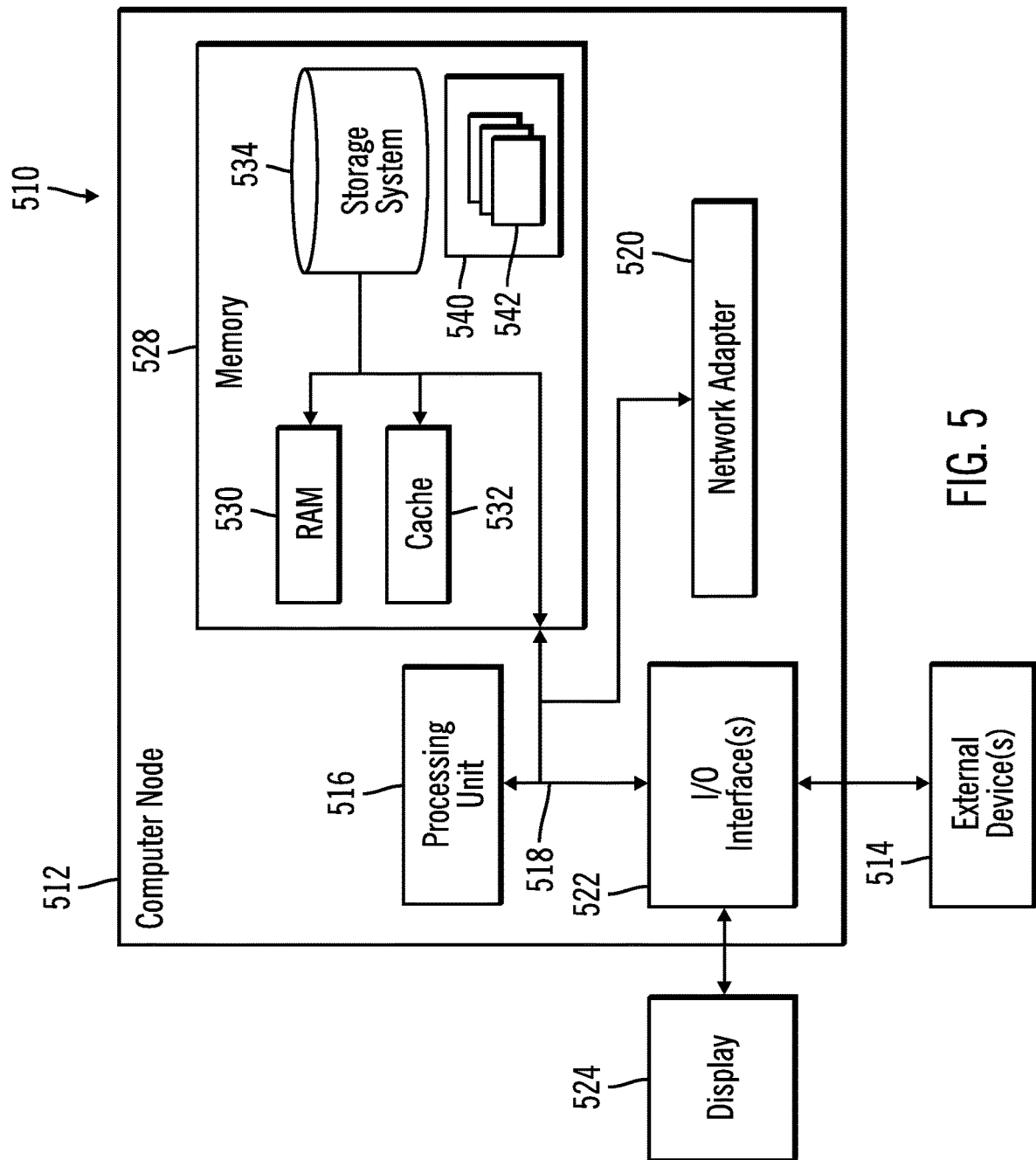
FIG. 5 illustrates a computing node in accordance with certain embodiments.

FIG. 5 illustrates a computing environment 510 in accordance with certain embodiments. In certain embodiments, the computing environment is a cloud computing environment. Referring to FIG. 5, computer node 512 is only one example of a suitable computing node and is not intended to suggest any limitation as to the scope of use or functionality of embodiments of the invention described herein. Regardless, computer node 512 is capable of being implemented and/or performing any of the functionality set forth hereinabove.

The computer node 512 may be a computer system, which is operational with numerous other general purpose or special purpose computing system environments or configurations. Examples of well-known computing systems, environments, and/or configurations that may be suitable for use with computer node 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 512 may be described in the general context of computer system executable instructions, such as program modules, being executed by a computer system. Generally, program modules may include routines, programs, objects, components, logic, data structures, and so on that perform particular tasks or implement particular abstract data types. Computer node 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer node 512 is shown in the form of a general-purpose computing device. The components of computer node 512 may include, but are not limited to, one or more processors or processing units 516, a system memory 528, and a bus 518 that couples various system components including system memory 528 to one or more processors or processing units 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 512 typically includes a variety of computer system readable media. Such media may be any available media that is accessible by computer node 512, and it includes both volatile and non-volatile media, removable and non-removable media.

System memory 528 can include computer system readable media in the form of volatile memory, such as random access memory (RAM) 530 and/or cache memory 532. Computer node 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, system memory 528 may include at least one program product having a set (e.g., at least one) of program modules that are configured to carry out the functions of embodiments of the invention.

Program/utility 540, having a set (at least one) of program modules 542, may be stored in system memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer node 512 may also communicate with one or more external devices 514 such as a keyboard, a pointing device, a display 524, etc.; one or more devices that enable a user to interact with computer node 512; and/or any devices (e.g., network card, modem, etc.) that enable computer node 512 to communicate with one or more other computing devices. Such communication can occur via Input/Output (I/O) interfaces 522. Still yet, computer node 512 can communicate with one or more networks such as a local area network (LAN), a general wide area network (WAN), and/or a public network (e.g., the Internet) via network adapter 520. As depicted, network adapter 520 communicates with the other components of computer node 512 via bus 518. It should be understood that although not shown, other hardware and/or software components could be used in conjunction with computer node 512. Examples, include, but are not limited to: microcode, device drivers, redundant processing units, external disk drive arrays, RAID systems, tape drives, and data archival storage systems, etc.

In certain embodiments, the source code management server 105 and each developer computing device 150*a* . . . 150*n* has the architecture of computer node 512. In certain embodiments, the source code management server 105 and each developer computing device 150*a* . . . 150*n* are part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
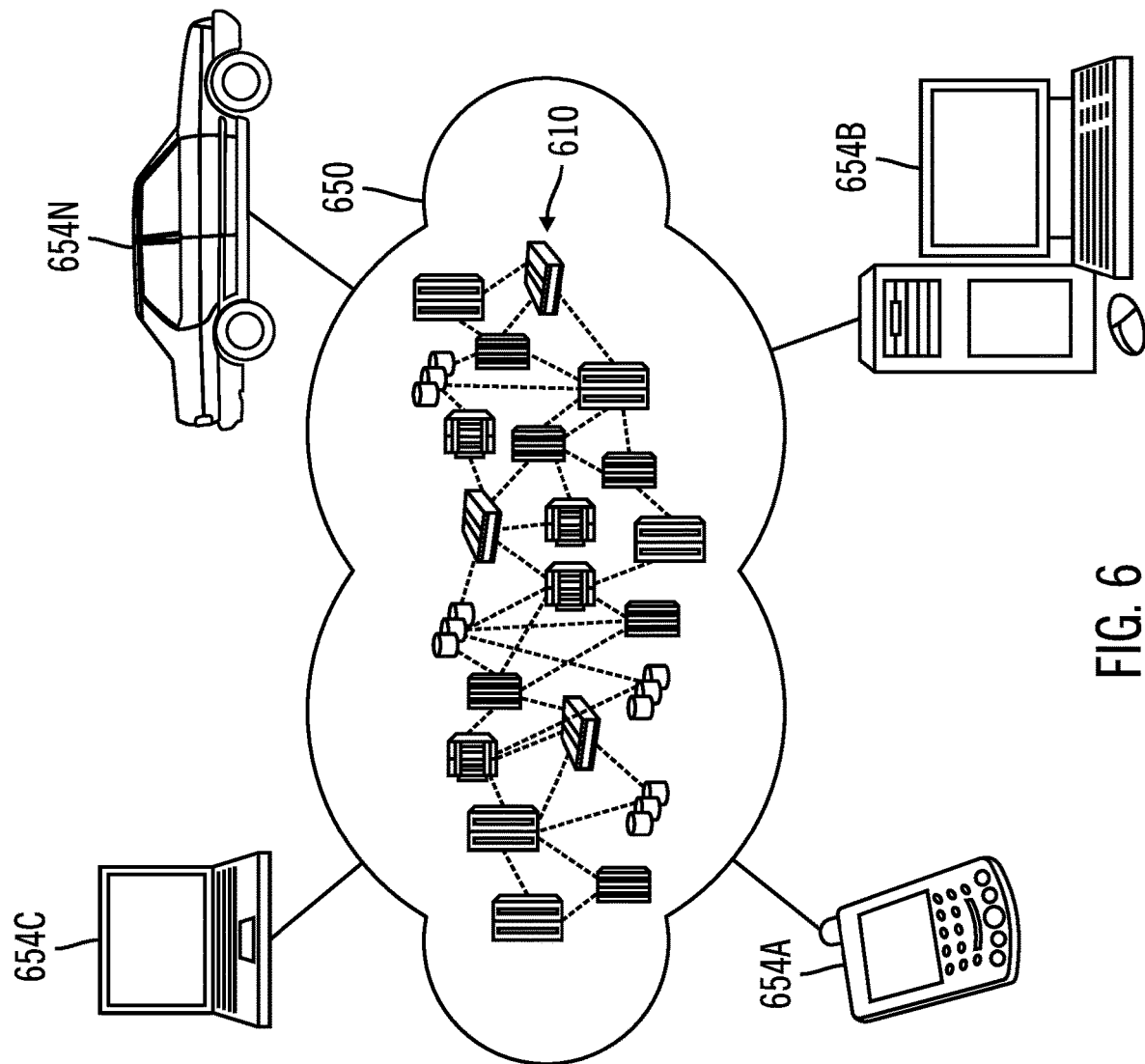
FIG. 6 illustrates a cloud computing environment in accordance with certain embodiments.

Referring now to FIG. 6, illustrative cloud computing environment 620 is depicted. As shown, cloud computing environment 620 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 620 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 620 can communicate with any type of computerized device over any type of network and/or network addressable connection (e.g., using a web browser).

Figure 7:
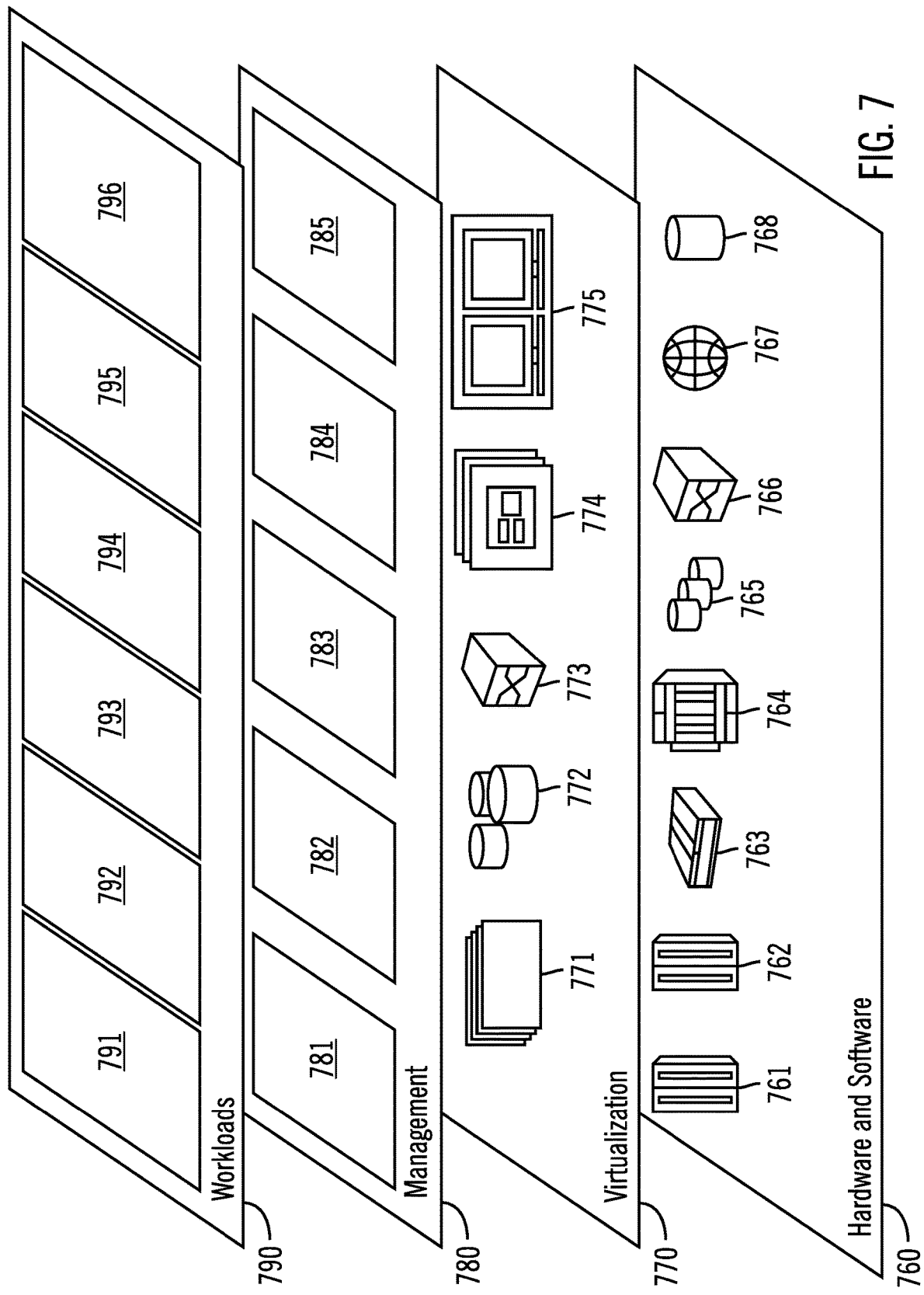
FIG. 7 illustrates abstraction model layers in accordance with certain embodiments.

Referring now to FIG. 7, a set of functional abstraction layers provided by cloud computing environment 620 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and identifying and deleting unnecessary code lines 796.

Thus, in certain embodiments, software or a program, implementing identifying and deleting unnecessary code lines in accordance with certain embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
    storing a plurality of global behavioral rules, wherein each of the global behavioral rules includes a behavioral pattern code fragment, an occurrence value for the behavioral pattern code fragment, a plurality of recommendations, and a recommendation score for each of the plurality of recommendations;
    determining that a code fragment in a portion of code matches the behavioral pattern code fragment of a global behavioral rule of the plurality of global behavioral rules;
    providing a recommendation from the plurality of recommendations of the global behavioral rule based on the recommendation score of the recommendation;
    in response to the recommendation being applied, increasing the recommendation score of the recommendation; and
    in response to the recommendation being rejected,
        identifying an action taken; and
        storing the action taken as a new recommendation for the behavioral pattern code fragment of the global behavioral rule.

2. The computer-implemented method of claim 1, wherein the global behavioral rule was generated for a portion of code from a first code file, and wherein the portion of the code is from a second code file.

3. The computer-implemented method of claim 1, wherein changes to the code are monitored to identify any combination of added code lines and deleted code lines, and wherein a local behavioral rule is generated based on the monitoring.

4. The computer-implemented method of claim 3, wherein the local behavioral rule is sent for storage as a new global behavioral rule.

5. The computer-implemented method of claim 1, comprising further operations for:
receiving a local behavioral rule;
in response to determining that the local behavioral rule is similar to the global behavioral rule, merging the local behavioral rule with the global behavioral rule; and
in response to determining that the local behavioral rule is not similar to the global behavioral rule, storing the local behavioral rule as a new global behavioral rule.

6. The computer-implemented method of claim 1, wherein a Software as a Service (SaaS) is configured to perform the operations of the method.

7. A computer program product, the computer program product comprising a computer readable storage medium having program code embodied therewith, the program code executable by at least one processor to perform operations for:
storing a plurality of global behavioral rules, wherein each of the global behavioral rules includes a behavioral pattern code fragment, an occurrence value for the behavioral pattern code fragment, a plurality of recommendations, and a recommendation score for each of the plurality of recommendations;
determining that a code fragment in a portion of code matches the behavioral pattern code fragment of a global behavioral rule of the plurality of global behavioral rules;
providing a recommendation from the plurality of recommendations of the global behavioral rule based on the recommendation score of the recommendation;
in response to the recommendation being applied, increasing the recommendation score of the recommendation; and
in response to the recommendation being rejected,
identifying an action taken; and
storing the action taken as a new recommendation for the behavioral pattern code fragment of the global behavioral rule.

8. The computer program product of claim 7, wherein the global behavioral rule was generated for a portion of code from a first code file, and wherein the portion of the code is from a second code file.

9. The computer program product of claim 7, wherein changes to the code are monitored to identify any combination of added code lines and deleted code lines, and wherein a local behavioral rule is generated based on the monitoring.

10. The computer program product of claim 9, wherein the local behavioral rule is sent for storage as a new global behavioral rule.

11. The computer program product of claim 7, wherein the program code is executable by the at least one processor to perform operations for:
receiving a local behavioral rule;
in response to determining that the local behavioral rule is similar to the global behavioral rule, merging the local behavioral rule with the global behavioral rule; and
in response to determining that the local behavioral rule is not similar to the global behavioral rule, storing the local behavioral rule as a new global behavioral rule.

12. The computer program product of claim 7, wherein a Software as a Service (SaaS) is configured to perform the operations of the computer program product.

13. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more computer-readable memories, to perform operations comprising:
storing a plurality of global behavioral rules, wherein each of the global behavioral rules includes a behavioral pattern code fragment, an occurrence value for the behavioral pattern code fragment, a plurality of recommendations, and a recommendation score for each of the plurality of recommendations;
determining that a code fragment in a portion of code matches the behavioral pattern code fragment of a global behavioral rule of the plurality of global behavioral rules;
providing a recommendation from the plurality of recommendations of the global behavioral rule based on the recommendation score of the recommendation;
in response to the recommendation being applied, increasing the recommendation score of the recommendation; and
in response to the recommendation being rejected,
identifying an action taken; and
storing the action taken as a new recommendation for the behavioral pattern code fragment of the global behavioral rule.

14. The computer system of claim 13, wherein the global behavioral rule was generated for a portion of code from a first code file, and wherein the portion of the code is from a second code file.

15. The computer system of claim 13, wherein changes to the code are monitored to identify any combination of added code lines and deleted code lines, and wherein a local behavioral rule is generated based on the monitoring.

16. The computer system of claim 15, wherein the local behavioral rule is sent for storage as a new global behavioral rule.

17. The computer system of claim 13, wherein the operations further comprise:
receiving a local behavioral rule;
in response to determining that the local behavioral rule is similar to the global behavioral rule, merging the local behavioral rule with the global behavioral rule; and
in response to determining that the local behavioral rule is not similar to the global behavioral rule, storing the local behavioral rule as a new global behavioral rule.

18. The computer system of claim 13, wherein a Software as a Service (SaaS) is configured to perform the operations of the computer system.

* * * * *